United States Patent
Burgman et al.

(10) Patent No.: US 7,239,055 B2
(45) Date of Patent: Jul. 3, 2007

(54) MOTOR COOLING SYSTEM

(75) Inventors: Boris I. Burgman, Oak Park, MI (US); Richard A. Pashnik, Saline, MI (US); Henryk Sowul, Oxford, MI (US)

(73) Assignees: GM Global Technology Operations, Inc., Detroit, MI (US); DaimlerChrysler AG, Stuttgart (DE); DaimlerChrysler Corporation, Auburn Hills, MI (US)

( * ) Notice: Subject to any disclaimer, the term of this patent is extended or adjusted under 35 U.S.C. 154(b) by 98 days.

(21) Appl. No.: 11/153,170

(22) Filed: Jun. 15, 2005

(65) Prior Publication Data

US 2006/0022528 A1 Feb. 2, 2006

Related U.S. Application Data

(60) Provisional application No. 60/591,748, filed on Jul. 28, 2004.

(51) Int. Cl.
  *H02K 9/00* (2006.01)
  *H02K 9/19* (2006.01)
  *H02K 5/20* (2006.01)

(52) U.S. Cl. .................. 310/52; 310/54; 310/67 R; 310/112; 475/149

(58) Field of Classification Search .......... 310/52, 310/54, 89
  See application file for complete search history.

(56) References Cited

U.S. PATENT DOCUMENTS

| | | | | |
|---|---|---|---|---|
| 3,531,668 A | * | 9/1970 | Cathey | 310/58 |
| 4,870,307 A | * | 9/1989 | Kitamura et al. | 310/54 |
| 5,111,090 A | * | 5/1992 | Otake et al. | 310/54 |
| 5,156,579 A | * | 10/1992 | Wakuta et al. | 475/161 |
| 5,931,757 A | * | 8/1999 | Schmidt | 475/2 |
| 6,355,995 B1 | * | 3/2002 | Jeppesen | 310/52 |
| 6,579,202 B2 | * | 6/2003 | El-Antably et al. | 475/159 |
| 6,710,479 B2 | * | 3/2004 | Yoshida et al. | 310/52 |
| 7,002,267 B2 | * | 2/2006 | Raszkowski et al. | 310/54 |

FOREIGN PATENT DOCUMENTS

| | | | | |
|---|---|---|---|---|
| JP | 06269143 A | * | 9/1994 | |
| JP | 09079118 A | * | 3/1997 | |
| JP | 2001190047 A | * | 4/2004 | |
| JP | 2005030216 A | * | 2/2005 | |

* cited by examiner

*Primary Examiner*—Burton Mullins
(74) *Attorney, Agent, or Firm*—Christopher DeVries

(57) ABSTRACT

The invention provides a structural member for a vehicle transmission formed with an annular recess in fluid communication with a fluid source and at least partially enclosing and defining an interior space of the transmission. An interior component, such as a motor/generator, is located in the interior space. The annular recess directs cooling fluid provided from the fluid source onto the interior component. The end cover includes structure defining a flow passage in fluid communication with a fluid source and also defining an annular recess in fluid communication with the flow passage. The flow passage and the annular recess are cooperatively configured for directing fluid provided from the fluid source onto an interior component in the interior space for cooling the interior component. Preferably, the interior component is an electric motor/generator that includes a stator having electric windings. The fluid is directed from the annulus onto the electric windings.

10 Claims, 4 Drawing Sheets

MOTOR COOLING SYSTEM

CROSS REFERENCE TO RELATED APPLICATIONS

This Application claims the benefit of U.S. Provisional Application No. 60/591,748, filed Jul. 28, 2004, which is hereby incorporated by reference in its entirety.

TECHNICAL FIELD

This invention relates to cooling of a motor/generator in a hybrid electromechanical vehicular transmission.

BACKGROUND OF THE INVENTION

A hybrid electromechanical vehicular transmission utilizes interactive planetary gear arrangements that are operatively connected to an engine and two motor/generators. Selective utilization of torque transfer devices enables power transfer via the planetary gear arrangements from the engine and/or motor/generators to the output member of the transmission.

A power transmission in an electromechanical transmission is described in commonly owned U.S. Provisional Application No. 60/590,427 entitled Electrically Variable Transmission with Selective Fixed Ratio Operation, filed Jul. 22, 2004, and hereby incorporated by reference in its entirety.

Motor/generators in an electromechanical transmission are typically cooled by directing transmission fluid from a fluid source such as a pump to the motor/generators. A cooling system that requires a minimum of added machining and assembly steps, added components and minimal or no increase in pump capacity is desirable.

SUMMARY OF THE INVENTION

Novel transmission structure is provided to permit efficient cooling of motor/generators. A motor cooling system is provided using transmission components adjacent to the motor/generators such that a minimum of added machining, assembly steps, added components and minimal or no increase in pump capacity is required.

A transmission that has an interior component (i.e., a motor/generator) and a fluid source (such as a pump) is provided with a structural member formed with an annular recess. The annular recess is in fluid communication with the fluid source. The structural member partially encloses and defines an interior space of the transmission. The interior component is located in the interior space. The annular recess is cooperatively configured for directing fluid provided from the fluid source onto the interior component to cool the interior component.

Within the scope of the invention, the structural member may be an end cover. The end cover may be formed with another annular recess that also directs fluid provided from the fluid source onto the interior component. Optionally, the end cover may define a flow passage in fluid communication with both the fluid source and the annual recess. A ring-shaped sleeve formed with circumferentially-spaced radial openings may be provided that fits within the end cover adjacent the first annular recess such that fluid from the fluid source flows through the circumferentially-spaced radial openings for cooling the interior component. The circumferentially-spaced openings may be configured such that fluid is provided in the form of a mist so that wear on the interior component is minimized. For instance, the openings may be nozzle shaped (tapered) so that the fluid is ejected in a mist form. A deflector may also be positioned between the structural member and the interior component so that fluid directed from the annular recess is deflected by the deflector, slowing the fluid prior to contact with the interior component.

The interior component may be an electric motor/generator having a stator with stator windings. The structural member may be an annular stator support connected to an end cover. The annular stator support may define the circumferentially-spaced radial openings in fluid communication with the annular recess for allowing fluids to flow from the fluid source to the stator windings.

A motor cooling system for an electromechanical transmission having a first motor/generator includes a fluid source for providing fluid and a structural member formed with an annular recess as described above.

A method of cooling a motor/generator in an electromechanical transmission having a fluid source includes providing a structural member formed with an annular recess that is in fluid communication between the fluid source and the motor/generator. The structural member at least partially encloses the motor/generator. The method further includes directing fluid from the fluid source through the annular recess to the motor/generator to cool the motor/generator. Optionally, the structural member may also define a flow passage in fluid communication between the fluid source and the annular recess. In that case, the method may include directing fluid from the fluid source through the flow passage to the annular recess.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

FIRST EXEMPLARY EMBODIMENT

Motor Cooling System

Figure 1:
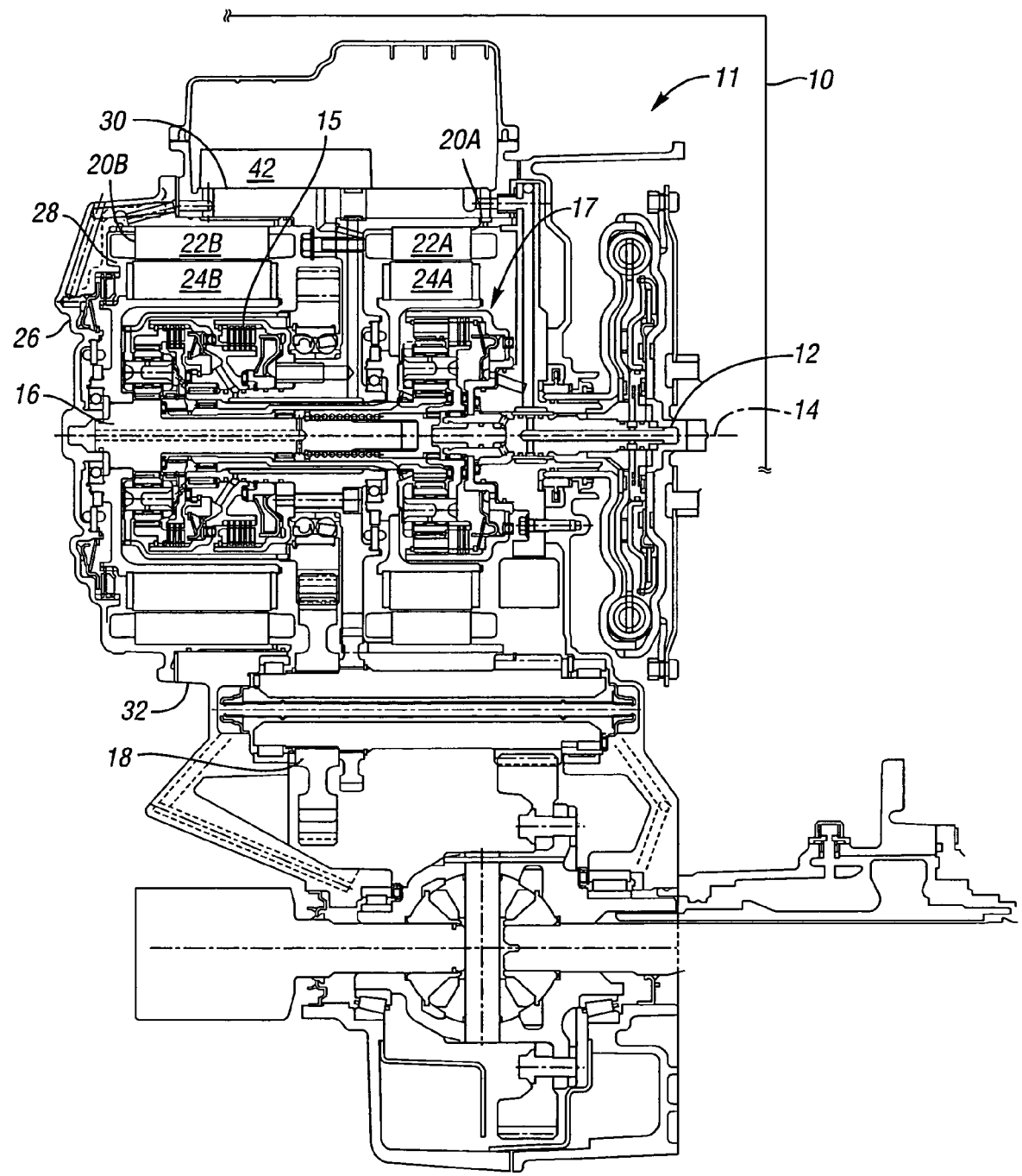
FIG. 1 is a schematic cross-sectional illustration in fragmentary view of a first embodiment of a hybrid electrical/mechanical transmission.

Referring to the drawings wherein like reference numbers refer to like components, FIG. 1 shows a vehicle 10 having an electromechanical transmission 11. An input shaft 12 is disposed about a center axis 14 and is operable for transferring power from an engine (not shown) to the transmission 11. A main shaft 16 is longitudinally disposed and rotatable about the center axis 14 and is engageable with the input shaft 12. The engagement of one or more of a plurality of clutches such as clutch 15 interconnects one or more of a plurality of planetary gear sets such as planetary gear set 17 to transfer power at varying ratios to an output member 18. Two electric motor/generators 20A and 20B are coaxially oriented about the center axis 14. Each motor/generator 20A, 20B is selectively operatively connectable to a member of one of the planetary gear sets to provide a range of continuously variable speed ratios between the input shaft 12 and the output member 18, as will be readily understood by those skilled in the art. Each of the motor/generators 20A, 20B includes a respective generally ring-shaped stator 22A, 22B and a generally ring-shaped rotor 24A, 24B, respectively, rotatable with respect to the respective stator 22A, 22B. An end cover 26 is mounted with respect to the main shaft 16. The end cover 26 partially encases the motor/generators 20A, 20B within and partially defines an interior space 28. The end cover 26 cooperates with a first portion 30 of a housing member (i.e., an upper portion of a transmission case) and a second portion 32 of the housing member (i.e., a lower portion of the transmission case) to further encase the motors/generators 20A, 20B within the interior space 28. An O-ring 33 helps to seal the interface between the end cover 26 and the first and second portions 30, 32 of the housing member.

Figure 2:
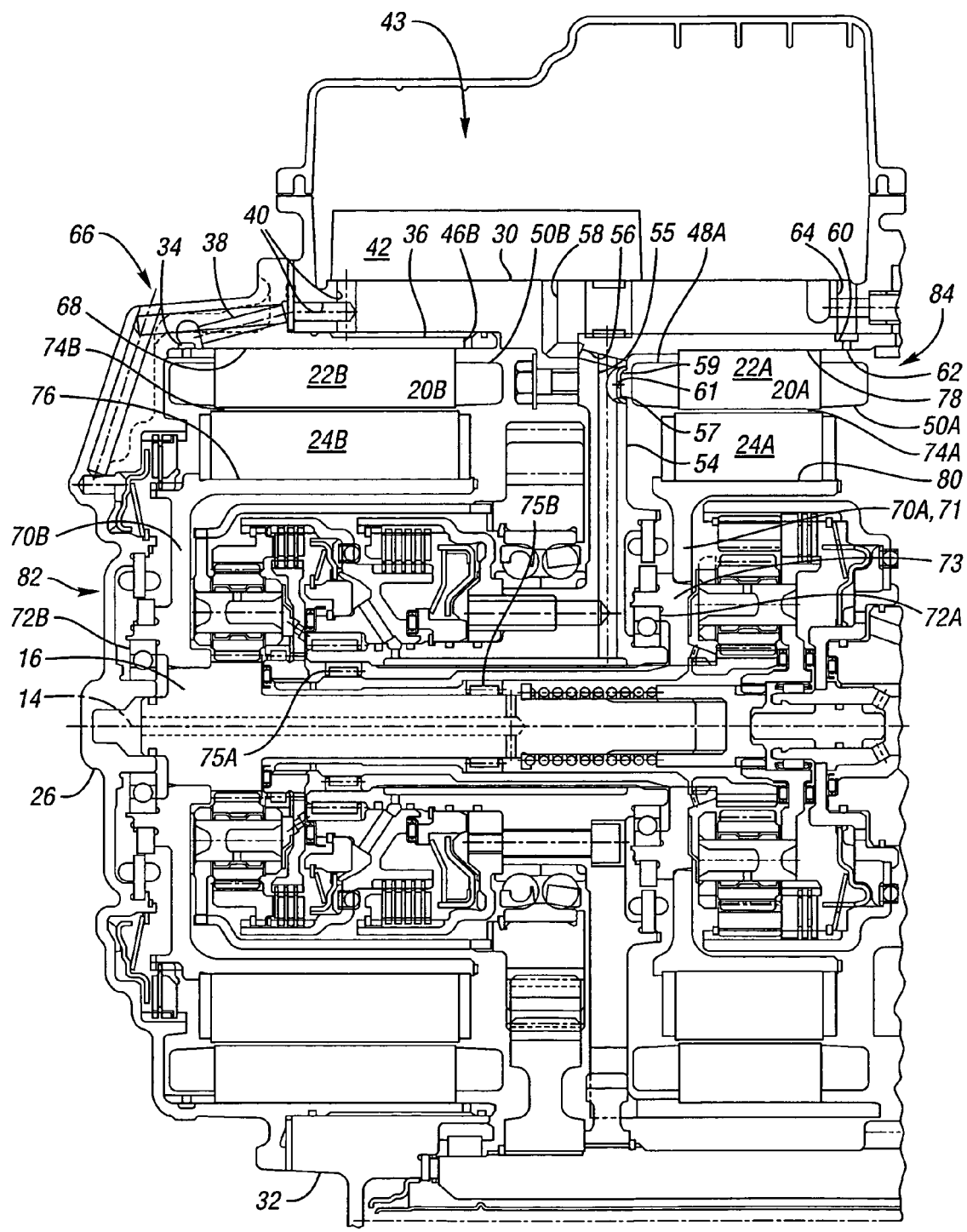
FIG. 2 is a schematic cross-sectional illustration in fragmentary view of the transmission of FIG. 1 including an end cover and a motor cooling system.

Referring now to FIG. 2, the end cover 26 is formed with first and second annular recesses 34, 36, respectively. Furthermore, a first flow passage 38 is bored through the end cover 26 to create a fluid communication between the first annular recess 34 and a second flow passage 40 formed in the first portion 30 of the housing member. A valve body 42 is in fluid communication with a fluid source such as a pump (not shown) and is capable of delivering pressurized fluid via the second flow passage 40 to the first flow passage 38 from which the fluid flows to the first annular recess 34. For illustrative purposes, the valve body 42 is shown directly adjacent to the second flow passage 40 in housing cavity 43; however, the valve body 42 may be more remotely located and connected via hydraulic passages to the second flow passage 40. Additionally, the fluid source or pump may be located anywhere on the vehicle and fluidly connected with the valve body 42, as will be understood by those skilled in the art.

Figure 3:
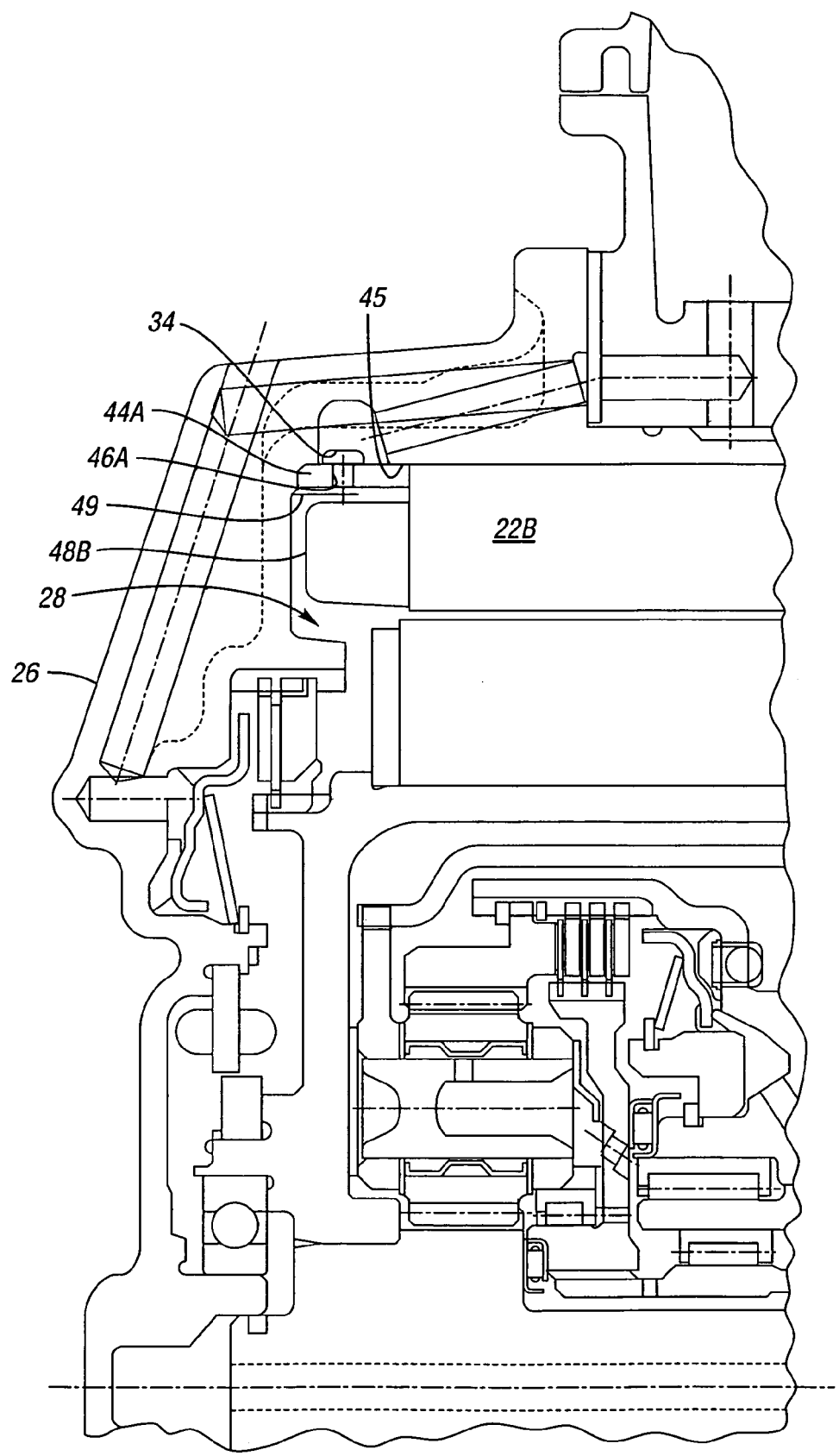
FIG. 3 is a schematic partially cross-sectional illustration in fragmentary view of a portion of the motor cooling system of FIG. 2.

As may be better viewed in FIG. 3, a ring-shaped sleeve 44A is press fit to an inner surface 45 of the end cover 26. The ring-shaped sleeve 44A includes a plurality of circumferentially-spaced radial openings 46A that permit fluid communication between the first annular recess 34 and the interior space 28. Specifically, the circumferentially-spaced radial openings 46A direct fluid onto first end (i.e., left side) stator windings 48B of the stator 22B to cool the windings 48B. The circumferentially-spaced radial openings 46A may be designed to present the fluid in the form of a mist over the stator windings 48B to prevent wear associated with high velocity fluid spray (e.g., by varying the diameter of the openings or by tapering the openings). Alternatively, nozzles may be fit within the radially-spaced openings 46A and configured to present the fluid in the form of a mist. Yet another alternative is to connect a deflector 49 to the end cover 26 or to the ring shaped sleeve 44A to deflect fluid flowing from the circumferentially-spaced radial openings 46A, thereby slowing the velocity of the fluid prior to the fluid contacting the windings 48B. The deflector 49 may be a steel flange. A single, ring-shaped deflector may be used or separate deflectors 49 may be placed under each respective circumferentially-spaced radial opening 46A.

Referring again to FIG. 2, the second annular recess 36 is in fluid communication with the second flow passage 40. Furthermore, a second set of circumferentially-spaced radial openings 46B are formed in the end cover 26 such that they are in fluid communication with the second annular recess 36. Pressurized fluid from the fluid source flows from the valve body 42 through the second flow passage 40 and the second annular recess 36 to the circumferentially-spaced radial openings 46B and onto the second end (i.e., right side) stator windings 50B for cooling thereof. As with the first set of circumferentially-spaced radial openings 46A, the second set of circumferentially-spaced radial openings 46B may be configured to supply fluid to the second end stator winding 50B in the form of a mist.

A center support 54 is rigidly supported with respect to the main shaft 16 about the center axis 14 and supports the stator 22A as described below. A third flow passage 56 is formed within the center support 54 and is in fluid communication with the valve body 42 through a fourth flow passage 58 formed in the first portion 30 of the transmission case. Cooling fluid is supplied to first end (i.e., left side) stator windings 48A of the stator 22A via the third and fourth flow passages 56, 58. A drilled bore 55 in the center support 54 intersects an annular cavity 57. An annular plate 59 having an orifice 61 is press fit into the cavity 57. Fluid flows from the third passage 56, into the bore 55, into the cavity 57 and through the orifice 61 to cool the first end stator windings 448A. The center support 54 is formed with a third annular recess 60 which is in fluid communication with a third set of circumferentially-spaced radial openings 62 which are also formed in the center support 54. Cooling fluid is supplied to second end (i.e., right side) stator windings 50A of the stator 22A from the valve body 42 via a fifth flow passage 64 in fluid communication with the third annular recess 60 and through the third set of circumferentially-spaced radial openings 62.

Referring to FIGS. 2–3, a motor cooling system 66 for the motor/generator 20B includes the end cover 26 having the first flow passage 38 and being formed with first and second annular recesses 34, 36, respectively. Furthermore, the motor cooling system 66 may include the ring-shaped sleeve 44A having the first set of circumferentially-spaced radial openings 46A for cooling the left side stator windings 48B. The motor cooling system 66 may also include the second set of radially-spaced openings 46B formed in the end cover 26 to provide fluid communication between the second annular recess 36 and the right side stator windings 50B for cooling thereof via fluid provided from a fluid source.

Stator Support and Motor/Generator Packaging Module

Referring to FIG. 2, the stator 22B includes a plurality of segmented portions (one portion shown) spaced about an inner surface 68 of the end cover 26. Those skilled in the art will readily understand the segmented nature of the stator 22B. The inner surface 68 of the end cover 26 may be provided with slots coordinating with extensions on the segmented portions of the stator 22B for fixedly connecting the segments to the end cover 26.

A first rotor hub 70B is rotatably supported by the end cover 26 at a bearing 72B and is welded to the main shaft 16. The rotor 24B is rigidly connected to the first rotor hub 70B and is rotatable therewith with respect to the end cover 26. A gap 74B is achieved between the stator 22B and the rotor 24B and is controlled by the radial dimensions of the rotor 24B and the stator 22B and the distance between an exterior surface 76 of the first rotor hub 70B and the inner surface 68 of the end cover 26. Because the rotor hub 70B is mounted at the shaft bearing 72B and is supported by the end cover 26 which also forms the inner surface 68, variability in the gap 74B due to build tolerances is minimized (i.e., the dimensions of one element, the end cover 26, influence the positioning and dimensional play at both ends (the exterior surface 76 of the first rotor hub 70B and the inner surface 68 of the end cover 26) of the space in which the motor/generator 20B is packaged).

The stator 22A includes a plurality of segmented portions spaced about an inner surface 78 of the center support member 54. The inner surface 78 of the center support member 54 may be provided with slots coordinating with extensions on the segmented portions of the stator 22A for fixedly connecting the segments to the center support member 54.

A second rotor hub 70A consists of welded outer portion 71 and inner portion 73. The rotor 24A is rigidly connected to the second rotor hub 70A and is rotatable therewith with respect to the center support 54. The second rotor hub 70A is partially supported by the center support 54 at bearing 72A. A gap 74A is achieved between the stator 22A and the rotor 24A and is controlled by the radial dimensions of the rotor 24A and the stator 22A and the distance between an outer surface 80 of the second rotor hub 70A and the inner surface 78 of the center support member 54. Because the second rotor hub 70A is supported by the center support member 54, the dimensions of one component (the center support member 54) influence the positioning and dimensional play at both ends (i.e., the inner side 78 of the center support member 54 and the exterior surface 80 of the rotor hub 70A) of the space in which the motor/generator 20A is packaged.

Support of the rotor 24B is further provided by bearing 75B, disposed between the shaft 16 and the rotor hub 70A, because the weight of the motor 20B and rotor hub 70B are distributed to the shaft 16 since the rotor hub 70B is welded to the shaft 16. Likewise, support of the rotor 24A is further provided by shaft bearing 75A disposed between the rotor hub 70A and the center support 54. Thus, support of the rotors 24A, 24B is cantilevered, rather than provided on either side of each rotor, as is typically done. The rotors 24A and 24B are both grounded or steadied by a common member, the shaft 16. Rotor 24B is steadied by the shaft 16 because the rotor hub 70B is welded to it. Rotor 24A is steadied by the shaft 16 via the shaft bearing 75B. By supporting the rotors 24A, 24B at a common member (the shaft 16), unintended run out between the rotors 24A, 24B is minimized.

Because for each motor/generator 20A and 20B, the rotor 24A, 24B and stator 22A, 22B are supported by a common member (the center support 54 and end cover 26, respectively) the invention allows each motor/generator 20A, 20B to be easily prepackaged as a module prior to attachment with the transmission 11. The motor/generator module 82 for motor/generator 20B includes the end cover 26 having the stator 22B fit at the inner surface 68. The rotor 24B is rigidly connected to the rotor hub 70B, which is then fit to the end cover 26 at the bearing 72B. The entire module 82 (end cover 26, stator 22B, rotor 24B, bearing 72B and rotor hub 70B) may then be piloted on to the shaft 16 and welded thereto as a unit. Similarly, the motor/generator module 84 for motor/generator 20A includes the center support 54 having stator 22A fit at the inner surface 78. The rotor 24A is rigidly connected to the rotor hub 70A, which is then fit to the center support 54 at bearing 72A and bearing 75A. The entire module 84 (which includes center support 54, stator 22A, rotor 24A and rotor hub 70A) may then be piloted on to the shaft 16 over bearing 75B as a unit.

The end cover 26 as well as the center support 54 may be iron. By forming these components from iron, magnetivity of the motor/generators 20A and 20B is increased as the iron in the end cover 26 and the center support 54 (which will be disposed both above the stators and below the rotors) supplements the magnets in the respective motor/generators 20B, 20A to increase torque capacity.

SECOND EXEMPLARY EMBODIMENT

Motor Cooling System

Figure 4:
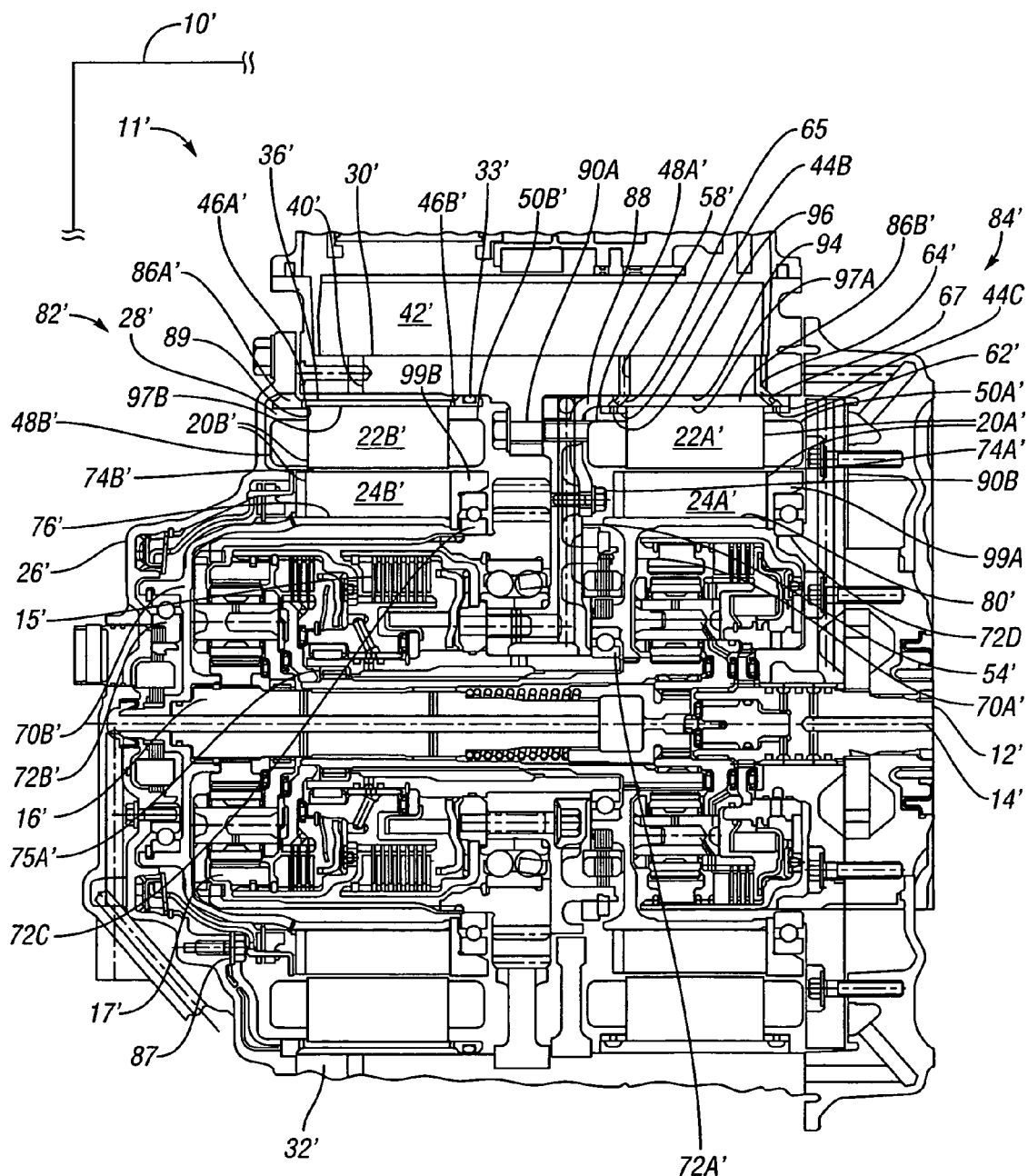
FIG. 4 is a schematic partially cross-sectional illustration in fragmentary view of a second embodiment of a hybrid electrical/mechanical transmission.

Referring to FIG. 4, a vehicle 10' includes an electro-mechanical transmission 11'. An input shaft 12' is disposed about a center axis 14' and is operable for transferring power from an engine (not shown) to the transmission 11'. A main shaft 16' is longitudinally disposed and rotatable about the center axis 14' and is engagable with the input shaft 12'. The engagement of one or more of a plurality of clutches such as clutch 15' interconnects one or more of a plurality of planetary gear sets such as planetary gear set 17' to transfer power at varying ratios to an output member (not shown, but situated similarly to output member 18 of FIG. 1). Two electric motor/generators 20A' and 20B' are coaxially oriented about the center axis 14'. Each motor/generator 20A', 20B' is selectively operatively connectable to a member of one of the planetary gear sets to provide a range of continuously variable speed ratios between the input shaft 12' and the output member, as will be readily understood by those skilled in the art. Each of the motor/generators 20A', 20B' includes a generally ring-shaped stator 22A', 22B' and a generally ring-shaped rotor 24A', 24B', respectively, rotatable with respect to the respective stator 22A', 22B'. An end cover 26' is mounted with respect to the main shaft 16'. The end cover 26' partially encases the motor/generators 20A', 20B' within and partially defines an interior space 28'. The end cover 26' includes a first annular stator support 86A'. The stator support 86A' is bolted to the end cover 26' with bolt 87 and cooperates with a first portion 30' of a housing member (i.e., an upper portion of a transmission case) and a second portion 32' of the housing member (i.e., a lower portion of the transmission case) to further encase the motors/generators 20A', 20B' within the interior space 28'. The first annular stator support 86A' is formed with a notched portion 89 which aids in positioning the stator 22B'. The stator 22B' is held in position against the notched portion 87 to prevent movement of the stator 22B' due to magnetic forces.

The first annular stator support 86A' is formed with an annular recess 36'. Furthermore, flow passage 40' is formed in the first portion 30' of the housing member. A valve body 42' is in fluid communication with a fluid source such as a pump (not shown) and is capable of delivering pressurized fluid via the flow passage 40' to the annular recess 36'. For illustrative purposes, the valve body 42' is shown directly adjacent to the flow passage 40'; however, the valve body 42' may be more remotely located and connected via hydraulic passages to the flow passage 40'. An o-ring 33' is disposed between the first portion of the housing 30' and the first annular stator support 86A' to help prevent leakage of fluid from a space formed between the annular recess 36' and the first portion 30' of the housing. Additionally, the fluid source or pump may be located anywhere on the vehicle and fluidly connected with the valve body 42', as will be understood by those skilled in the art.

A plurality of circumferentially-spaced radial openings 46A' are formed in first the annular stator support 86A' to permit fluid communication between the annular recess 36' and the interior space 28'. Specifically, the circumferentially-spaced radial openings 46A' direct fluid onto first end (i.e., left side) stator windings 48B' of the stator 22B' to cool the windings 48B'. The circumferentially-spaced radial openings 46A' may be designed to present the fluid in the form of a mist over the stator windings 48B' to prevent wear associated with high velocity fluid spray (e.g., by varying the diameter of the openings or by tapering the openings). Alternatively, nozzles may be fit within the radially-spaced openings 46A' and configured to present the fluid in the form of a mist. Yet another alternative is to connect a deflector to the end cover 26' or to the first annular stator support 86A', positioned adjacent to the circumferentially-spaced radial openings 46A' similarly to the positioning of deflector 49 of FIG. 3, to deflect fluid flowing from the circumferentially-spaced radial openings 46A', thereby slowing the velocity of the fluid prior to the fluid contacting the windings 48B'. The deflector may be a steel flange. A single, ring-shaped deflector may be used or a separate deflector may be placed under each respective circumferentially-spaced radial opening 46A'.

A second set of circumferentially-spaced radial openings 46B' are formed in the first annular stator support 86A' such that they are in fluid communication with the annular recess 36'. Pressurized fluid from the fluid source flows from the valve body 42' through the flow passage 40' and the annular recess 36' to the circumferentially-spaced radial openings 46B' and onto the second end (i.e., right side) stator windings 50B' for cooling thereof. As with the first set of circumferentially-spaced radial openings 46A', the second set of circumferentially-spaced radial openings 46B' may be configured to supply fluid to the second end stator winding 50B' in the form of a mist.

A center support 54' is rigidly supported with respect to the main shaft 16' about the center axis 14'. A second annular stator support 86B' is welded to a support element 88 which in turn is bolted to the center support 54' via 90A and 90B. Bolt 90A also connects both the support element 88 and the second annular stator support 86B' to the first portion 30' of the housing member. Alternatively, the second annular stator support 86B' and the support element 88 may be formed as a unitary component. A fourth flow passage 58' and a fifth flow passage 64' are formed in the first portion 30' of the transmission case in fluid communication with the valve body 42'. Sixth and seventh flow passages 65, 67 are formed in the second annular stator support 86B' in fluid communication with the fourth and fifth flow passages 58', 64', respectively. First and second ring-shaped sleeves or annular spray rings 44B, 44C are press-fit against an inner surface 94 of the first portion 30' of the housing member. A third set 62' and a fourth set 96 of circumferentially-spaced radial openings are formed in the respective annular spray rings 44C, 44B, such that they are in fluid communication with the seventh and sixth flow passages 67, 65, respectively, of the second annular stator support 86B'. Cooling fluid is supplied to first end (i.e., left side) stator windings 48A' of the stator 22A' via the fourth and sixth flow passages 58' and the fourth set of circumferentially-spaced radial openings 96. Cooling fluid is supplied to second end (i.e., right side) stator windings 50A' of the stator 22A' from the valve body 42 via a fifth flow passage 64' in fluid communication with the seventh flow passage 67 through the third set of circumferentially-spaced radial openings 62'.

A motor cooling system 66' for the motor/generator 20B' includes the second annular stator support 86B' having the sixth and seventh flow passages 65, 67. Furthermore, the motor cooling system 66' may include the ring-shaped sleeves 44B, 44C having the fourth and third sets of radially-spaced openings 96, 62' for cooling the left side and right side stator windings 48A', 50A', respectively.

To assemble the motor/generator 20A' within the transmission 11', the support element 88 is bolted to the center support 54'. The second annular stator support 86B' is press fit against the inner surface 94 of the first portion 30' of the housing member in the interior cavity space 28'. The ring sleeves 44B, 44C are press fit against the second annular stator support 86B'. The stator 22A' is then press fit against the inner surface 97B of the second annular stator support 86B' between the spray rings 44B, 44C.

Stator Support and Motor/Generator Packaging Module

Referring to FIG. 4, the stator 22B' includes a plurality of segmented portions spaced about an inner surface 97B of the first annular stator support 86A'. The inner surface 97B may be provided with slots coordinating with extensions on the segmented portions of the stator 22B' for fixedly connecting the segments to the annular stator support 86A'.

A first rotor hub 70B' is rotatably supported by the end cover 26' at a bearing 72B' and is welded to the main shaft 16'. The rotor 24B' is rigidly connected to the first rotor hub 70B' and is rotatable therewith with respect to the end cover 26'. A gap 74B' is achieved between the stator 22B' and the rotor 24B' and is controlled by the radial dimensions of the rotor 24B' and the stator 22B' and the distance between an exterior surface 76' of the first rotor hub 70B' and the inner surface 97B of the annular stator support 86A'. Because the rotor hub 70B' is mounted at the shaft bearing 72B' which is supported by the end cover 26', and because the end cover 26' also supports the annular stator support 86A' which forms the inner surface 97B, variability in the gap 74B' due to build tolerances is minimized.

The stator 22A' includes a plurality of segmented portions spaced about an inner surface 97A of the second annular stator support 86B'. The inner surface 97A may be provided with slots coordinating with extensions on the segmented portions of the stator 22A' for fixedly connecting the segments to the annular stator support 86B'.

The rotor 24A' is rigidly connected to a second rotor hub 70A' and is rotatable therewith with respect to the center support 54'. The second rotor hub 70A' is partially supported by the center support 54' at bearing 72A'. A gap 74A' is achieved between the stator 22A' and the rotor 24A' and is controlled by the radial dimensions of the rotor 24A' and the stator 22A' and the distance between an outer surface 80' of the second rotor hub 70A and an inner surface 97A of the annular stator support 86B'.

Support of the rotor 24B' is further provided by bearing 72C via a rotor flange 99B welded to the rotor hub 70B'. Likewise, support of the rotor 24A' is further provided by bearing 72D via a rotor flange 99A welded to the rotor hub 70A'. Bearing 72D is support by separate structure, as shown in FIG. 4. Support of the rotor 24A' is further provided by shaft bearing 75A' disposed between the rotor hub 70A' and the center support 54'.

Because for each motor/generator 20A' and 20B', the rotor 24A', 24B' and stator 22A', 22B' are supported by a common member (the center support 54' and end cover 26', respectively) the invention allows each motor/generator 20A', 20B' to be easily prepackaged as a module prior to attachment with the transmission 11. The motor/generator module 82' for motor/generator 20B' includes the end cover 26' and the first annular stator support 86A' having the stator 22B' fit at the inner surface 97B. The rotor 24B' is rigidly connected to the rotor hub 70B', which is then fit to the end cover 26' at the bearing 72B'. The entire module 82' (end cover 26', stator 22B', rotor 24B', rotor hub 70B' and rotor flange 99B) may then be piloted on to the shaft 16' and welded thereto as a unit. Similarly, the motor/generator module 84' for motor/generator 20A' includes the center support 54' and the second annular stator support 86B' having stator 22A' fit at the inner surface 97A. The rotor 24A' is rigidly connected to the rotor hub 70A', which is then fit to the center support 54' at bearing 72A'. The entire module 84' (which includes center support 54', bearing 72D, bearing 72A', the annular stator support 86A', stator 22A', ring-shaped sleeves 44B, 44C, rotor 24A', rotor hub 70A' and rotor flange 99A) may then be piloted on to the shaft 16 as a unit.

The end cover 26' as well as the center support 54' may be iron. By forming these components from iron, magnetivity of the motor/generators 20A' and 20B' is increased as the iron in the end cover 26' and the center support 54' (which will be disposed both above the stators and below the rotors) supplements the magnets in the respective motor/generators 20B', 20A' to increase torque capacity.

While the best modes for carrying out the invention have been described in detail, those familiar with the art to which this invention relates will recognize various alternative designs and embodiments for practicing the invention within the scope of the appended claims.

The invention claimed is:

1. A transmission having an interior component and a fluid source, the transmission comprising:
    a structural member formed with an annular recess in fluid communication with the fluid source;
    wherein said structural member at least partially encloses and partially defines an interior space of the transmission;
    wherein the interior component is located in said interior space;
    wherein said annular recess is cooperatively configured for directing fluid provided from the fluid source onto the interior component to cool the interior component;
    wherein said structural member is a transmission end cover; and
    a ring-shaped sleeve having circumferentially-spaced radial openings, said ring-shaped sleeve fitting within said transmission end cover adjacent said annular recess such that said circumferentially-spaced radial openings are in fluid communication with said annular recess, the fluid from the fluid source flowing through said circumferentially-spaced radial openings for cooling the interior component.

2. The transmission of claim 1, wherein said transmission end cover farther defines another annular recess cooperatively configured for directing fluid provided from the fluid source onto the interior component to cool the interior component; and
    wherein said transmission end cover further defines a flow passage in fluid communication with both the fluid source and said another annular recess for directing fluid from the fluid source to said another annular recess.

3. The transmission of claim 1, wherein said circumferentially-spaced radial openings are configured such that fluid is provided to the interior component in the form of a mist.

4. The transmission of claim 1, further comprising:
    a deflector positioned between said structural member and the interior component such that fluid directed from said annular recess is deflected by said deflector prior to cooling said interior component, said deflector being operable for slowing the flow of the fluid.

5. A motor cooling system for an electromechanical transmission having a first motor/generator, the motor cooling system comprising:
    a fluid source for providing fluid;
    a structural member formed with an annular recess in fluid communication with said fluid source, said structural member at least partially defining an interior space and at least partially enclosing the first motor/generator in said interior space;
    said annular recess being cooperatively configured for directing fluid provided from said fluid source to the first motor/generator for cooling of the first motor/generator; and
    a ring-shaped sleeve having circumferentially-spaced radial openings, said ring-shaped sleeve fitting within said structural member adjacent said annular recess such that said circumferentially-spaced radial openings are in fluid communication with said annular recess, the fluid from said fluid source flowing through said circumferentially-spaced radial openings for cooling the interior component.

6. The motor cooling system of claim 5, wherein said structural member is a transmission end cover;
    wherein said transmission end cover further defines another annular recess cooperatively configured for directing fluid from said fluid source onto the first motor/generator; and
    wherein said transmission end cover further defines a flow passage in fluid communication with both said fluid source and said another annular recess for directing fluid from said fluid source to said another annular recess.

7. The motor cooling system of claim 6, wherein said structural member further defines circumferentially-spaced radial openings in fluid communication with said another annular recess; and
    wherein the fluid is directed through said circumferentially-spaced radial openings onto said motor/generator.

8. The motor cooling system of claim 5, wherein the electromechanical transmission has a second motor/generator, wherein said structural member is a first structural member, and further comprising:
    a second structural member having a flow passage in fluid communication with said fluid source, said structural member further defining said interior space and at least partially enclosing said second motor/generator therein, said flow passage being cooperatively configured for directing fluid provided from said fluid source onto the second motor/generator for cooling thereof.

9. A method of cooling a motor/generator in an electromechanical transmission having a fluid source, the method comprising:
    providing a structural member at least partially enclosing the motor/generator, the structural member having an annular recess formed therein; said annular recess being in fluid communication between the fluid source and the motor/generator;
    fitting a ring-shaped sleeve to the structural support member adjacent the annular recess; wherein the ring-shaped sleeve has circumferentially-spaced radial openings; and
    directing fluid from the fluid source through said annular recess to the motor/generator for cooling thereof.

10. The method of claim 9, wherein said structural member further defines a flow passage in fluid communication between the fluid source and said annular recess, the method further comprising:

directing fluid from the fluid source through said flow passage to said annular recess.

* * * * *